United States Patent [19]

Fleming, Jr. et al.

[11] Patent Number: 5,000,771
[45] Date of Patent: Mar. 19, 1991

[54] METHOD FOR MANUFACTURING AN ARTICLE COMPRISING A REFRACTORY DIELECTRIC BODY

[75] Inventors: James W. Fleming, Jr., Westfield, N.J.; Fred P. Partus, Atlanta, Ga.

[73] Assignee: AT&T Bell Laboratories, Murray Hill, N.J.

[21] Appl. No.: 458,921

[22] Filed: Dec. 29, 1989

[51] Int. Cl.$^5$ .............................................. C03B 37/10
[52] U.S. Cl. .......................................... 65/2; 65/3.11; 65/23; 65/31; 156/643; 156/663
[58] Field of Search .................... 65/2, 3.11, 23, 61, 65/31; 156/643, 663

[56] References Cited

U.S. PATENT DOCUMENTS

| | | | |
|---|---|---|---|
| 4,491,463 | 1/1985 | Weinstein et al. | 65/2 |
| 4,498,917 | 2/1985 | Weinstein et al. | 65/2 |
| 4,630,890 | 12/1986 | Ashkin et al. | 65/3.11 X |
| 4,698,126 | 10/1987 | Van Roosmalen et al. | 156/643 |
| 4,718,976 | 1/1988 | Fujimura | 156/643 |
| 4,758,304 | 7/1988 | McNeil et al. | 156/643 X |
| 4,793,897 | 12/1988 | Dunfield et al. | 156/643 |

*Primary Examiner*—Robert L. Lindsay
*Attorney, Agent, or Firm*—Eugen E. Pacher; Glenn E. Books

[57] ABSTRACT

To attain high strength optical glass fibers, the glass preforms, from which the fibers are drawn, must generally be free of surface imperfections such as bubbles, and air lines. It has been discovered that these imperfections can be removed quickly and cleanly by contacting the preform surface with a substantial portion of the electrically conducting plasma region (the plasma fireball) extending from a plasma torch. Significantly, the surface material is substantially removed by vaporization, due to the extremely high plasma temperature (>9000° C. at the plasma center) of the isothermal plasma torch. Though the temperatures in the tail of the plasma fireball are substantially less than at the plasma center, the temperatures are generally still several thousand degrees centigrade. These tail temperatures typically are sufficiently high to cause vaporization of most refractory dielectrics making the inventive method applicable to the fabrication of a wide variety of articles comprising refractory dielectric bodies.

Advantageously, selective etching, according to one aspect of the inventive method, is used to remove fiber preform eccentricity and to fabricate optical fiber preforms with non-circular cross-sections for such applications as fiber sensors. Selective etching can result by controlling the plasma fireball location, the rotation of the silica preform, and/or the travel of the fireball across the preform. Significantly, the fireball location is controlled, among other ways, by injecting into the torch an additional gas that has a high ionization threshold or by inserting a probe along the axis of the torch. In either case, a substantial portion of the plasma fireball is advantageously "pushed" outside the torch for ease of contact with the silica preform surface, or any other refractory dielectric being processed.

13 Claims, 4 Drawing Sheets

METHOD FOR MANUFACTURING AN ARTICLE COMPRISING A REFRACTORY DIELECTRIC BODY

TECHNICAL FIELD

This invention pertains to fabricating articles comprising refractory dielectric bodies, exemplarily, optical fibers or optical fiber preforms.

BACKGROUND OF THE INVENTION

The widespread use of optical fibers (lightguides) in telecommunications, medicine, and metrology can, in general, be directly related to the advent of low-loss glass fibers. Though some loss is inherent, low loss fibers result from reducing the loss mechanisms incorporated in the fiber during manufacture. These mechanisms include, among others, impurities that act as light absorbers, and geometrical distortions that lead to scattering of light outside the fiber. Additionally, widespread deployment of low loss optical fibers has generally required that fibers possess the material strength to withstand placement in harsh environments, which has been facilitated by reducing structural faults, such as bubbles or chemical impurities, that can cause significant mechanical stress and weakening of the fiber and/or can cause added loss. Typically, the loss mechanisms and structural faults in an optical fiber drawn from a glass preform result from these imperfections existing in the glass preform. Thus, to manufacture high strength, low loss glass fibers efficiently, techniques must be employed that reduce the loss mechanisms and structural faults present in the glass preform.

When loss mechanisms and structural faults result from preform surface imperfections, they can be substantially eliminated by removing surface material comprising the imperfection (this removal process being referred to as an etching process). Etching techniques, such as mechanical milling and chemical etching, are available that can be applied to glass preforms. Conventional chemical etching is relatively slow and is typically not a clean process. Though some imperfections are removed by chemical reaction, different imperfections can be incorporated as a byproduct of the etching reaction. In addition, chemical etching is typically isotropic, which is generally not suitable for selectively removing preform surface material. Mechanical milling is adaptable to the normal processing environment, but can introduce mechanical stress into the glass preform, and can lead to preform structural failure, e.g., formation of cracks that can propagate through the perform.

Additionally, the shortcomings associated with chemical etching and mechanical milling to remove surface imperfections also make these etching techniques undesirable for eliminating eccentricity in glass preforms. Eccentricity of a glass preform occurs when one or more of the three cross-sectional regions (core, deposited cladding, and substrate), of which the preform is typically comprised, deviate from a desired concentric configuration, resulting typically in geometrical distortions in the optical fiber. Deviations from a desired optical fiber design can generally lead to deviations from the fiber's desired light transmission characteristics. For example, light transmission through a passively aligned connector between two fibers can result in substantial loss if one of the fibers is eccentric, since the connector typically aligns the cross-sectional perimeters of the fiber ends which, due to eccentricity of at least one of the fibers, results in misaligning the fiber cores. Core alignment is generally crucial for providing low loss fiber connections. Therefore, a method of eliminating, or reducing to acceptable levels, preform eccentricity would be highly advantageous for the production of optical fibers that can be deployed in a conventional manner with little or no loss due to eccentricity.

SUMMARY OF THE INVENTION

In accordance with the inventive method, an article comprising a refractory dielectric material is manufactured by a process that includes cleanly and efficiently thermally etching at least a portion of the surface of a refractory dielectric body, resulting in a smooth, relatively imperfection-free and pure surface. The inventive method also provides a process for essentially eliminating, or reducing to acceptable limits, the eccentricity of a glass fiber preform by selectively etching the outer region or regions of the preform. The etching process involves bringing the refractory dielectric body surface to a position within proximity to a heat source, that can provide a sufficiently high temperature, so that material is substantially removed from the body surface by vaporization. As is well known to those skilled in the art, prior art methods of flame polishing exist that result in smoothing out surface material. However, these methods do not substantially involve vaporization of surface material. Significantly, in the inventive method, as a portion of the refractory dielectric body surface changes from a slid phase to a vapor phase, the remainder of the body substantially maintains its pre-etch shape.

In the currently preferred embodiment, the surface of an optical fiber preform is brought in contact with the plasma generated by an isothermal plasma torch. (Isothermal means the ion temperature and electron temperature are substantially the same in the plasma.) The plasma of an isothermal plasma torch typically comprises electrically conducting regions with a center region, in which the plasma temperature is the highest, and surrounding regions of lower temperature. For a plasma associated with an isothermal plasma torch, a plasma fireball is herein defined as that region consisting of the electrically conducting portion of the plasma into which the plasma sustaining electromagnetic energy is coupled.

Contact of a silica preform with a plasma fireball can be realized in several ways. A portion of a plasma fireball, and hence a portion of a plasma, is extended a small distance outside the torch by locating the source of plasma excitation at the open end (exit) of a typical plasma torch. While a portion of the fireball extends slightly outside the torch, the bulk of the plasma fireball is maintained within a confinement region in the torch, the plasma center generally situated symmetrically with respect to the excitation source. The plasma fireball then contacts the silica preform surface by moving the torch towards the preform (or equivalently the preform is moved towards the torch). The preform can be rotated as the plasma fireball is moved along the preform length, controlling the fireball/body contact.

Contact can be more advantageously attained by "pushing" a substantial portion of the plasma fireball out of the confinement region and, hence substantially out of the torch. Pushing a substantial portion of the plasma fireball outside of the torch is herein defined to mean locating a sufficient portion of the plasma fireball out of the torch such that a workpiece, such as an optical fiber preform, is contacted by more than just the tip of the fireball (though in some embodiments the fireball tip is used to etch a preform surface at a rate much slower than using a larger portion of the fireball). Typically, a preform/torch separation ranges from 0.1 to 100 mm, preferably from 5 to 10 mm. In terms of the fireball, the percentage of the fireball volume outside the torch ranges from less than 0.01% to almost 50%, with typical applications using from 5% to 30% of the fireball volume outside the torch.

Locating a substantial portion of the plasma fireball outside the torch can be accomplished when conditions within the confinement region are such that the region where electromagnetic energy is optimally coupled into the plasma gas comprises a substantial region outside the torch. With the plasma center located close to the exit of the torch, the plasma fireball can extend significantly from the torch exit, with an upper limit of about 50% of the fireball outside the torch. The currently preferred embodiment of the inventive method uses a technique for locating a substantial portion of the plasma fireball outside the torch that comprises introducing, in addition to an appropriate ionizable gas (herein to be referred to as the "discharge" gas), a gas, having a relatively high ionization threshold, into the torch, thereby increasing the energy required for plasma formation in the confinement region. A second technique for moving a substantial portion of the plasma fireball out of the confinement region uses a, typically water cooled, probe introduced into the torch along the center axis of the torch to alter the electromagnetic field distribution in the confinement region Optionally, this probe can be provided with an opening along its center line such that an additional gas can be delivered into the torch which can further enhance the fireball displacement.

Significantly, at least a substantial part of the material that is being removed from a silica preform is vaporized by the fireball of the plasma torch. As a result, etching a silica preform in accordance with the inventive method is a relatively fast, clean process, reducing the possibility that the etching process significantly introduces impurities. In addition, since the material is removed by vaporization (hence, there is no chemical reaction on or mechanical grinding of the preform surface), no significant mechanical stress concentrations are formed in the preform. Advantageously, selective etching according to one aspect of the inventive method can not only be used to remove preform eccentricity but also to produce preforms with non-circular cross-sections for such applications as fiber sensors. Selective etching can result by appropriately controlling the plasma fireball location, the rotation of the refractory dielectric body, and the travel of the plasma fireball across the silica preform. Additionally, the apparatus used to practice the inventive method can comprise conventional plasma torches modified to facilitate the fireball/preform contact and is relatively easily adapted to typical fiber optic manufacturing facilities.

FIg. 1 schematically depicts an exemplary plasma torch having a second gas source;

FIG. 2 schematically depicts an exemplary plasma torch having a probe along the center axis of a plasma confinement region;

FIG. 3 schematically depicts an exemplary plasma torch maintaining the plasma in a plasma confinement region;

FIG. 4 represents an exemplary configuration for etching a silica preform by a plasma fireball situated below the body;

FIg. 5 schematically indicates the reduction necessary to eliminate eccentricity in an exemplary fiber preform; and FIG. 6 schematically depicts a silica fiber preform with a non-circular cross-section manufactured in accordance with the inventive method.

Analogous features in different figures are identified by the same numerals. No attempt has been made to depict true dimensions and/or proportions.

DETAILED DESCRIPTION

It has been recently discovered that the high effective temperature of an isothermal plasma can be used for rapidly removing (etching), inter alia, silica and silicate glass from fiber preforms. With an isothermal plasma torch, the predominant mechanism for material removal is vaporization due to the high plasma temperature which can typically attain temperature levels greater than 9000° C. in the plasma center (For a discussion of the temperatures associated with plasma torches, see, for instance, T. B. Reed, *International Science and Technology*, June 1962, pp. 42–48). The temperatures within the plasma fireball typically are sufficiently high to cause vaporization of not only silica-based oxides but also most other refractory dielectrics, making the inventive method applicable to the fabrication of a wide variety of articles comprising refractory dielectric material. Significantly, contact of the electrically conductive fireball with the refractory dielectric surface efficiently transfers energy to the surface, relatively quickly bringing the surface temperature above the vaporization point of the refractory dielectric surface. Although the inventive method is not limited to etching silica-based oxide bodies, the discussion herein will be primarily in terms of etching silica-based optical fiber preforms.

Figure 1:
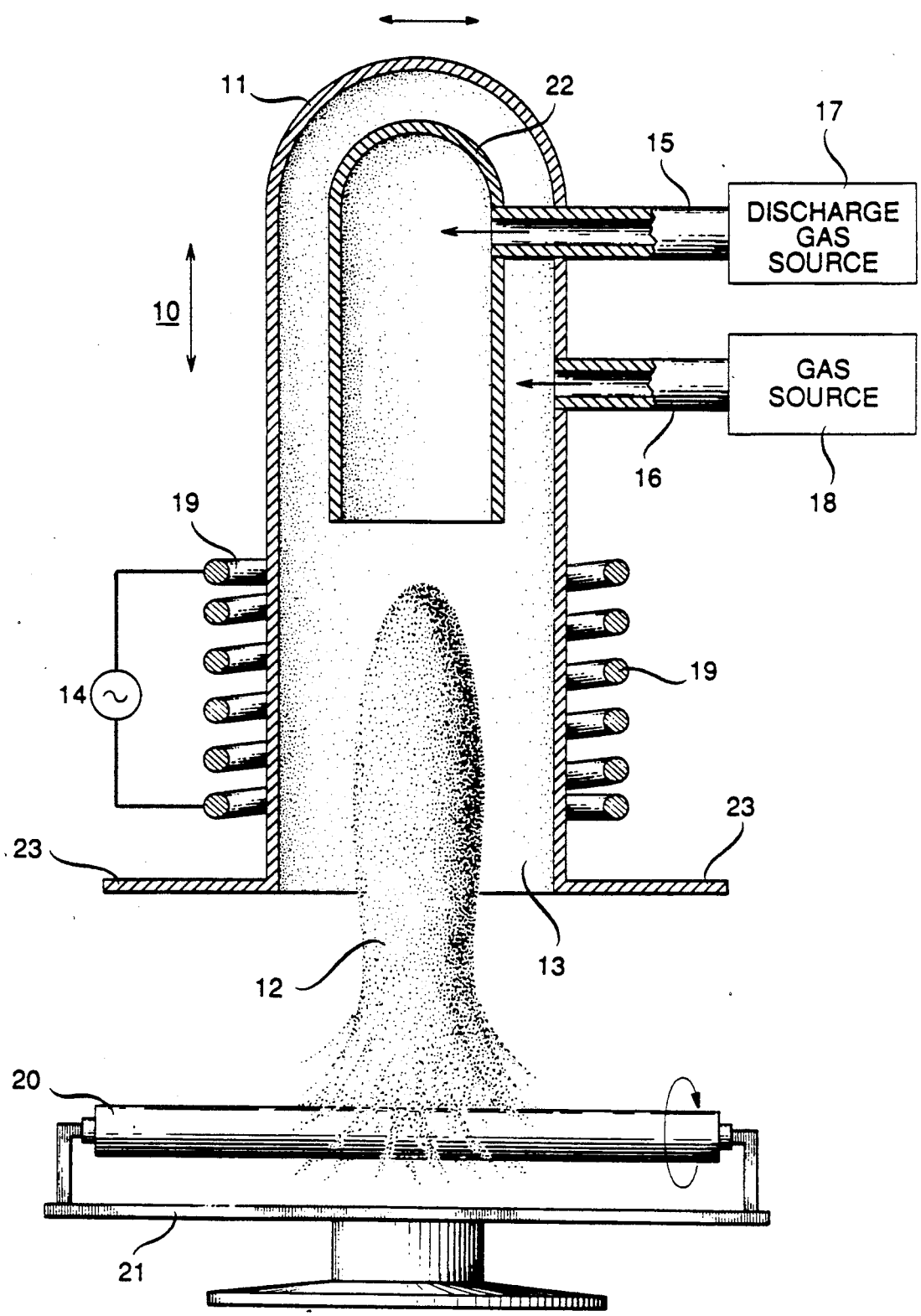

FIG. 1 schematically depicts an exemplary apparatus for practicing the inventive method. The torch 10 comprises a fused silica mantle 11 connected both to a gas source 18 by tube 16 and to a gas source 17 by tube 15. Gas source 17 delivers the desired gas used for the plasma discharge into the mantle 11 and through shield 22. The plasma fireball 12 is excited by a RF coil 19 and a RF generator 14. In a typical prior art plasma torch, gas sources are generally used to provide an ionizable gas, with the plasma fireball primarily contained in a confinement region 13 of the torch.

However, a substantial portion of the plasma fireball can be pushed out of the confinement region by adding, to the ionizable discharge gas, a high ionization threshold gas. The additional gas, supplied by gas source 18 and confined to the outer region of the torch by shield 22, creates an area in the upper portion of the confinement region where higher energy is needed to couple RF energy into the gases to form a plasma. However, a plasma will naturally form at locations where the resistance to formation is generally lowest, i.e., the location where the energy requirements are generally lowest. In essence, the high threshold gas moves a significant portion of the optimal region for plasma formation out of the confinement region. The portion of the fireball outside the torch is typically less than 50% of the fireball, since maintaining a stable plasma generally requires the plasma center to remain in the torch for sufficient energy to couple into the plasma from the RF source. Additionally, operation with the fireball extended outside the torch by approximately 30% to 50% of its volume generally places greater requirements on the power requirements of the RF source and the flow rate of the gases involved with the process than operation below 30% of the fireball volume. By pushing the plasma center towards the torch exit, the plasma fireball can easily contact a silica preform 20. Furthermore, contact is most readily made as the plasma fireball is pushed farther outside the torch.

The silica preform 20 is mounted on a lathe 21 in such a way that the body can be rotated. Generally, means for mounting and rotating a preform are known to those skilled in the art. Rotating a circularly cylindrical silica preform uniformly, with appropriate movement of the plasma torch along the preform, allows material to be removed from substantially the entire surface such that the silica preform retains its cross-sectional shape. On the other hand, by appropriately varying the rotation during etching (which can include some time interval during which the rotation is zero), a non-circular cross-section can be changed to an approximately circular cross-section.

The plasma fireball, as it moves across a rotating preform, contacts and etches the preform. The etch rate is a function of plasma traverse speed, among other factors, to the extent that the transverse speed influences the silica preform surface temperature. Thus, the etching process can be controlled by controlling the traverse speed, holding other parameters constant.

Parameters of a silica preform affecting its surface temperatures include its thermal capacity, thermal conductivity, emissivity, and heat of vaporization. Other parameters affecting the preform surface temperature are the energy being supplied to the plasma, and the plasma gas composition. In addition, torch apparatus and configuration can affect the etching rate. Such apparatus related parameters include torch design, torch to preform separation, torch to preform orientation (e.g. plasma above or below the preform, as later discussed), and plasma torch surroundings (i.e. muffling). For example, the fused quartz extension 23 of the torch body is used to prevent the plasma fireball or hot discharge gas from contacting the RF coil which could alter its electrical characteristics, which, in turn, could randomly alter the plasma location.

Figure 2:
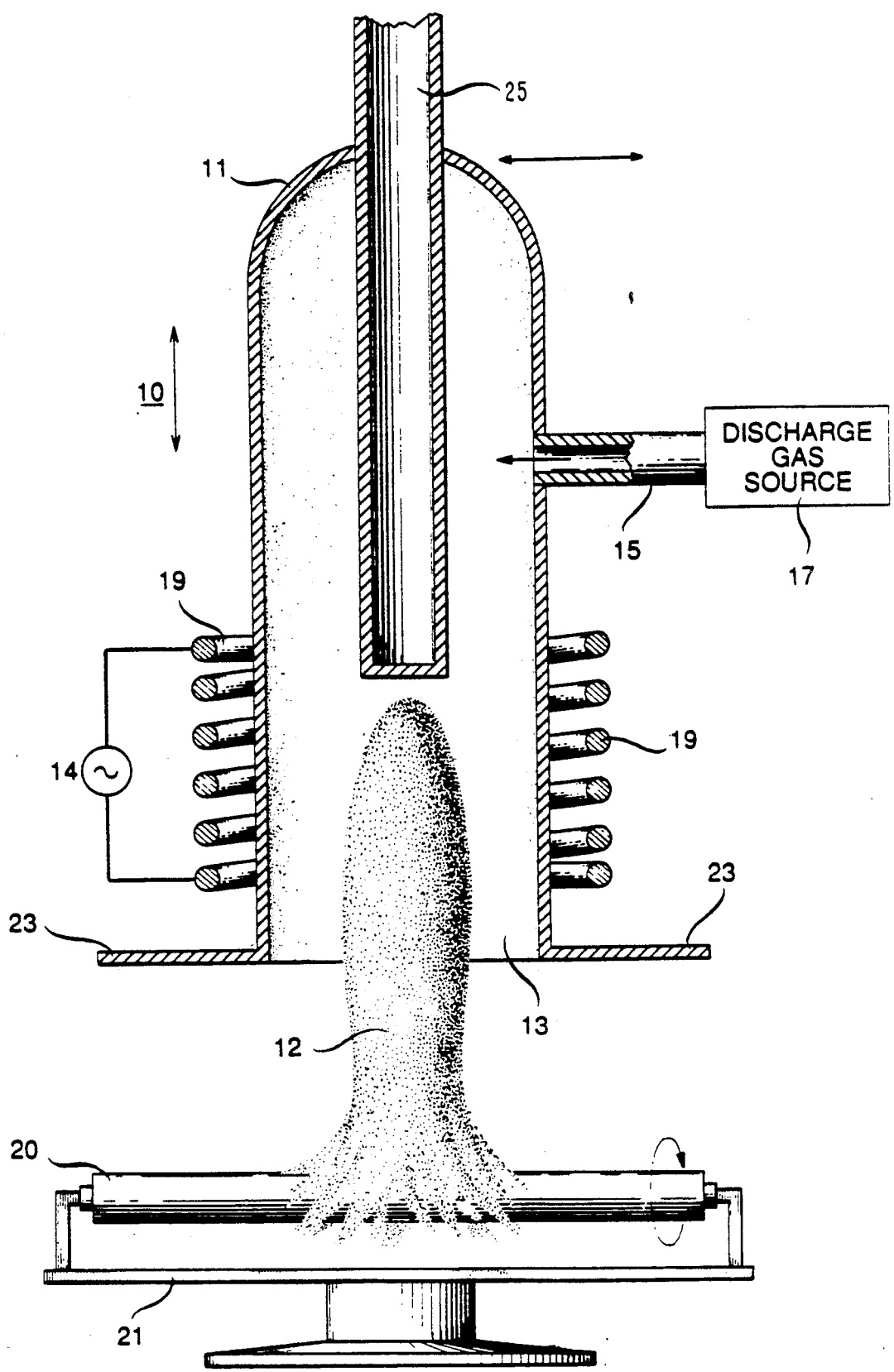

Though the method for moving a substantial portion of the plasma fireball from the torch using a high ionization threshold gas is the currently preferred embodiment for practicing the inventive method, other embodiments can be practiced. Another embodiment which also pushes a substantial portion of the plasma fireball out of its confinement region uses a probe extended into the mantle along the axis of the torch, instead of using an additional gas. The inserted electrically insulated probe generally changes the electromagnetic field distribution, pushing the optimal point for plasma formation towards the exit of the confinement region. With the probe appropriately placed, a substantial portion of the plasma fireball can be located external to the torch, though the plasma center remains within the torch. FIG. 2 depicts an exemplary plasma torch with a probe along the torch axis. The torch 10 comprises a fused silica mantle 11 connected to a gas source 17 by tube 15. Gas source 17 delivers the desired gas used for the plasma discharge into the mantle 11. The plasma fireball 12 is excited by a RF coil 19 and a RF generator 14. Movement of the water cooled probe 25 (means for water cooling not shown) along the axis of the torch, in turn, can move the plasma location. For certain positions of the probe, the probe pushes a substantial portion of the plasma fireball out of the confinement region 13, such that the plasma fireball can more readily come in contact with a silica preform 20 mounted on a lathe 21.

Figure 3:
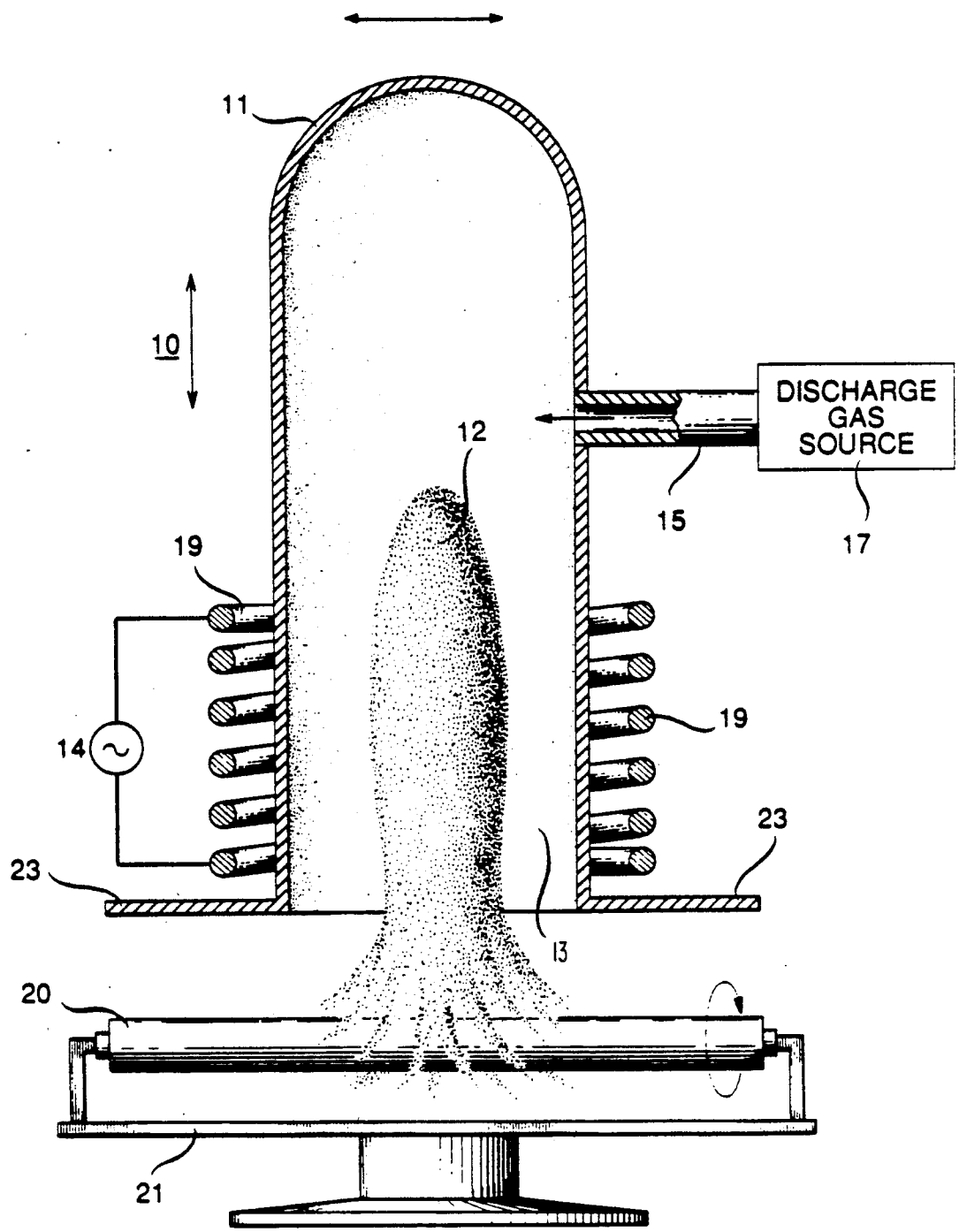

However, the inventive method can even be practiced without actively pushing (as previously described in the embodiments using a second gas or a probe to alter the location for optimally coupling electromagnetic energy into the plasma) the plasma fireball out of the confinement region. FIG. 3 depicts an exemplary torch for practicing the inventive method. The torch is similar to those depicted in FIGS. 1&2 except that there is no inlet for an additional gas, nor is there a probe along the axis of the torch. The plasma center remains in the confinement region substantially removed from the plasma torch exit, and the overall plasma fireball size can be enlarged by operating at high power, allowing the plasma fireball to extend outside the torch and contact the refractory dielectric body being processed. Furthermore, it is believed that locating a substantial portion of the plasma fireball outside the torch can also be attained by a relatively high flow rate of the discharge gas.

Figure 4:
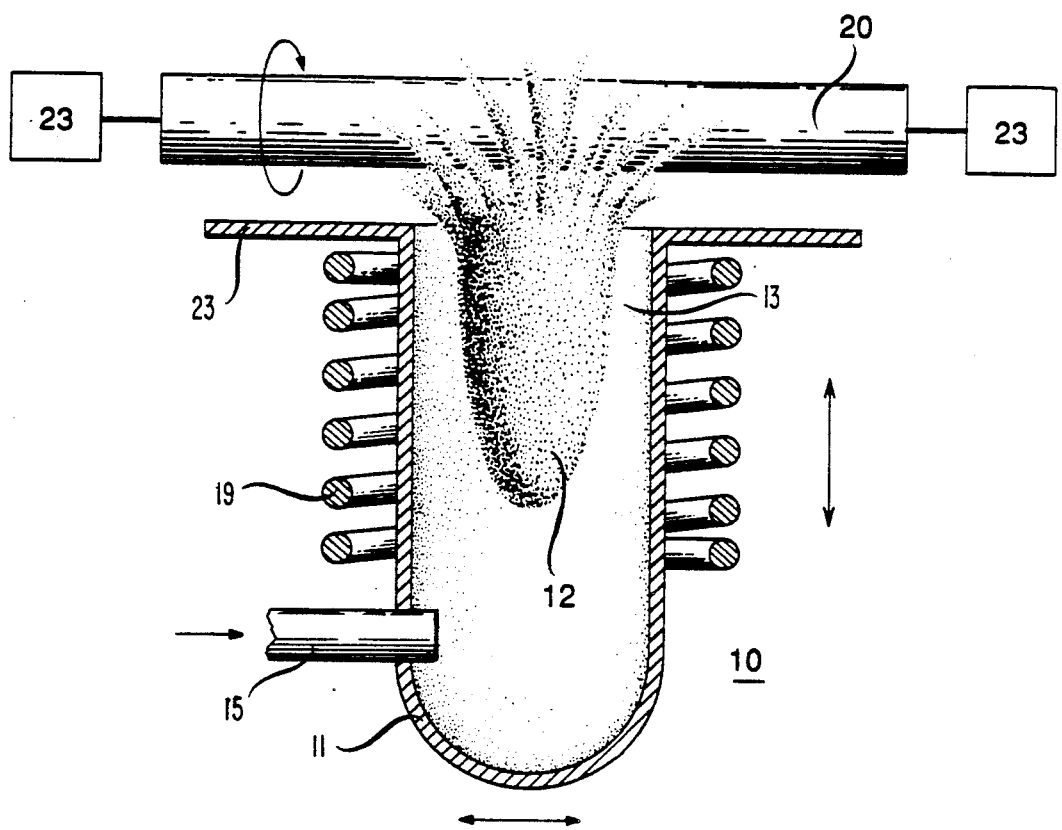

FIG. 1 schematically shows the inventive method being practiced with the fireball above the preform. The method can also be practiced with the torch 10 and the silica preform oxide body 20 inverted while mounted to holding apparatus 23 as in FIG. 4. Alternatively, a two torch configuration can be used such that both sides of the preform are simultaneously etched. The currently preferred embodiment uses the configuration with the fireball below the silica preform. With the plasma fireball in an upward configuration as in FIG. 4, the residual oxide bloom (silica formed as vapor material being removed from the silica preform surface condenses in cooler regions beyond the plasma fireball, forming a fine particulate that can deposit on the preform as a white soot) can be completely swept away leaving a pristine surface, a condition harder to achieve with the other configurations. Typically, in the configurations discussed above, the torch and silica preform surface are separated by 0.1 to 100 mm, preferably from 5 to 10 mm. Separations larger than 100 mm such that a limited portion of the fireball, for example the fireball tip, contacts the preform surface can typically result in slow etch rates, which can advantageously be used for providing the necessary etching rate for a relatively precise material etching process. Furthermore, the inventive method can be advantageously practiced with a vertical system in which the preform is mounted vertically and the plasma torch is mounted horizontally. In a horizontal system, mounting a preform in a cantilever manner, as is typically practiced, can develop, if a relatively large preform is being processed, a substantial mechanical moment with respect to the location at which the preform is mounted. However, in a vertical system, a preform is not mounted in a cantilever manner, but is mounted as a column without developing a significant mechanical moment.

Typically, the torch, used in the inventive method, can be automatically vertically adjusted and tilted such that the fireball can be placed in various positions with respect to the silica preform. Exemplarily, the plasma torch can be similar in size to standard torches having a confinement region typically between 30 to 60 mm in diameter.

Gas flow rates into the plasma torch with either $O_2$ or $O_2$/Ar as the currently preferred gas, generally range from 1 to 100 l/min. For embodiments using a high ionization threshold gas to push the plasma out of the confinement region, $N_2$ is typically used as the high ionization threshold gas, with a flow rate generally ranging from 1 to 40 l/min, though other high ionization threshold gases, such as He, can also be used. The high ionization threshold gas generally must have a higher energy threshold for ionization than the discharge gas.

The plasma fireball, excited by a RF generator that typically provides output power between 20 and 40 kW at exemplarily, 3 MHz, traverses a preform at speeds typically from 0.01 to 100 cm/sec covering about 1 meter of the preform being processed. Generally, the preform is rotated between 0.1 and 200 rpm, inclusively. These conditions can produce etch rates typically in the range from below 0.01 gm/min to greater than 10 gms/min. However, as can be appreciated by those skilled in the art, etching a silica surface can be performed under conditions widely varying from the typical ranges given. For instance, to make a preform with a special design or to reduce the eccentricity of the preform, the inventive method can be practiced without the preform being rotated, or with the preform rotated at rates less than 0.1 cm/sec. Furthermore, etching other refractory dielectrics such as zirconia can advantageously be practiced with the inventive method, though possibly under somewhat different typical conditions.

The inventive method can advantageously be practiced to remove impurities and other surface imperfections from the surface of a preform rod and the inner surface (inner wall) of a substrate tube prior to overcladding, or "jacketing," the preform rod with the substrate tube. The surface of the preform rod can be cleaned (removed of surface imperfections or chemical impurities) in one of the ways previously discussed for etching completed preforms. The inventive method can be advantageously practiced on other refractory dielectric rod-like structures to prepare (e.g. to clean) these structures for further processing in accordance with the applications for which these structures are intended.

To clean the inner wall of a substrate tube, on the other hand, the fireball must be introduced inside the tube, which can be accomplished by generating a small fireball outside the torch and inserting the fireball into the tube. Upon entering the tube, the fireball typically is small such that the fireball does not significantly contact the inner wall of the tube. Once inside the tube, the firewall is enlarged to contact the inner wall by increasing the gas flow into the plasma torch, the RF power, and/or by pushing a larger portion of the fireball outside the plasma torch into the substrate tube. To avoid deposit of material (removed by vaporization from the inner wall at the region of fireball contact) onto the inner wall at a cooler region of the tube, means to collect and remove the vaporized material can be applied to the inner region of the tube. Advantageously, the inventive method can be practiced on a wide range of refractory dielectric tubes to provide a clean inner wall.

Figure 5:
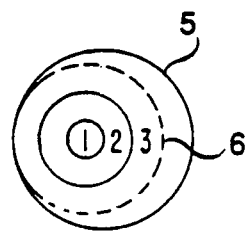

A significant embodiment of the inventive method provides for reducing fiber eccentricity during optical fiber manufacture. Eccentricity, in many cases, can be essentially eliminated, or at least reduced to acceptable levels, since an isothermal plasma torch can selectively etch a silica preform. Selectivity typically results directly from precisely monitoring the eccentricity during etching and precisely controlling the material removal process with a computer interfaced to the plasma torch, the rotation means, and the means for the plasma fireball to traverse the preform. Conventional procedures can be used to feedback information on the preform eccentricity to the computer, and conventional computer techniques can be used to control the process parameters for production of fiber preforms with negligible eccentricity. FIG. 5 exemplarily shows (in highly exaggerated form) a silica preform with a core 1 and deposited cladding 2 having the same center, but with a substrate 3 with a different center. To form a preform comprising three cross-sectional regions which are essentially circularly concentric, within acceptable limits, portions of outer material with surface 5 must be removed. By systematically varying the rotation rate, the material between 6 and 5 can be removed through contact with an isothermal plasma fireball, leaving the preform with an approximately circular surface 6.

Figure 6:
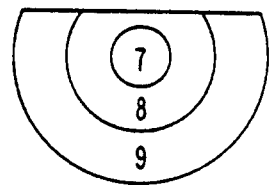

Control of the rotation rate also allows for the fabrication of optical glass fibers with cross-sections different than the conventional circular shapes. An example of this type of non-conventional fiber can be found in U.S. Pat. No. 4,630,890. FIG. 6 exemplarily shows a fiber preform with cross-sectional area that comprises a partially truncated circular region that can be manufactured having a core 7, deposited cladding 8, and substrate 9. This and similar structures can have application as fiber optic sensors where total light confinement to the core and deposited cladding regions is not desired. In addition to special optical fiber preforms for producing special fiber designs, other refractory dielectric bodies, such as refractory nitrides and silicon carbides, can be selectively etched so that their shapes or designs can be adapted to specific applications.

EXAMPLE 1

A standard silica-based single mode fiber preform having a 18 mm diameter was etched using a water cooled plasma torch. The plasma torch comprised a fused silica mantle having an approximately 50 mm diameter confinement region. A water cooled fused silica probe was located along the torch axis extending to a point immediately above a RF coil used to excite the plasma. The probe was inserted into the torch such that a substantial portion of the plasma fireball was located outside the torch. A RF generator supplied about 40 kW power at approximately 3 MHz, to the RF coil located at the opening to the torch. An $O_2$/Ar gas, for plasma formation, was introduced into the torch at a rate that varied from 10 to 25 l/min.

The preform was mounted on a glass working lathe such that the preform surface was between 5 to 10 mm from the torch, with the torch fireball above the preform. The preform was rotated at 60 rpm as the plasma torch was moved along the preform at speeds between 1-60 cm/sec. The rate of etching was determined using a micrometer to measure preform diameter within an 0.05 mm accuracy and using a balance that measured weight loss to a resolution of 0.01 gms. This process resulted in removal of silica, including its imperfections, from the surface at rates up to 3 gms/min.

EXAMPLE 2

A silica preform, comprising a synthetic silica substrate, was etched using a water cooled plasma torch. The torch comprised a fused mantle having an approximately 44 mm diameter confinement region. However, no center probe was used and the torch was provided with an additional gas inlet. A RF generator delivered about 20 kW output power at approximately 3 MHz to a RF coil located near the opening to the torch. An $O_2$ gas was introduced into the torch at a rate that varied from 10 to 25 l/min to form a plasma. $N_2$ was introduced through the additional inlet. The rate of $N_2$ flow was empirically raised to a level such that a substantial portion of the plasma fireball was pushed out of the torch.

The preform was mounted on a glass working lathe such that the preform surface was between 5 to 10 mm from the torch, with the torch fireball above the preform. The preform was rotated at 60 rpm as it traversed the plasma fireball at speeds between 1–60 cm/sec. The silica was etched at rates up to about 1 gm/min, as determined in a manner similar to Example 1.

EXAMPLE 3

Another silica preform, comprising a synthetic silica substrate, was etched in the same manner as in Example 2 except that the water cooled plasma torch did not use an additional gas. The bulk of the plasma remained in the confinement region, but a portion of the plasma fireball extended outside the torch. The silica surface was etched at rates up to approximately 1 gm/min.

We claim:

1. Method for manufacturing an article comprising a refractory dielectric material, the method comprising:
   (a) providing a refractory dielectric body;
   (b) removing a portion of material from the refractory dielectric body; and
   (c) completing manufacturing the article;
   Characterized in that
   (d) step (b) comprises exposing the refractory dielectric body to a substantially localized heat source so that at least a substantial part of the portion of material is removed by vaporization, the heat source comprising a plasma fireball generated by a plasma torch, the plasma fireball being the electrically conducting portion of a plasma into which plasma sustaining electromagnetic energy is coupled by the plasma torch.

2. Method of claim 1, wherein the heat source comprises contact with the plasma fireball generated by the plasma torch, the plasma generated from a first gas, associated with the first gas being an ionization threshold, and associated with the plasma torch being an axis.

3. Method of claim 2, wherein the refractory dielectric body is an optical fiber preform comprising a silica glass.

4. Method of claim 2, wherein the first gas comprises oxygen.

5. Method of claim 2, comprising introducing a second gas into the plasma torch, where the second gas has a ionization threshold that is higher than that of the first gas.

6. Method of claim 2, comprising positioning a substantial portion of the plasma fireball outside the plasma torch, the portion being in the range 0.01% to 50% of the fireball volume.

7. Method of claim 5, wherein the second gas is nitrogen.

8. Method of claim 2, wherein the plasma torch comprises an electrically insulated probe means extending into the plasma torch substantially along the plasma torch axis.

9. Method of claim 2, comprising moving the plasma fireball along the refractory dielectric body at a speed in the range 0.01–100 cm/sec.

10. Method of claim 2, comprising rotating the refractory dielectric body, at least during some interval while removing a portion of material from the refractory dielectric body, at varying rates in the range from 0.0 rpm to about 200 rpm.

11. Method of claim 3, wherein the article is an optical fiber.

12. Method of claim 3, wherein the preform further comprises a synthetic silica substrate.

13. Method of claim 2, wherein the article is an optical fiber sensor.

* * * * *